United States Patent [19]
Sebring et al.

[11] 3,784,337
[45] Jan. 8, 1974

[54] OIL SEAL ARRANGEMENT FOR ROTARY ENGINE

[75] Inventors: John G. Sebring, Arcanum; Thomas C. Downs, Dayton, both of Ohio

[73] Assignee: General Motors Corporation, Detroit, Mich.

[22] Filed: Nov. 6, 1972

[21] Appl. No.: 304,135

[52] U.S. Cl. .............................................. 418/142
[51] Int. Cl. ........................................... F01c 19/08
[58] Field of Search ............................ 418/142, 144; 277/96, 134

[56] References Cited
UNITED STATES PATENTS
3,263,657  8/1966  Gassman ..................... 418/142 X
3,396,708  8/1968  Tado ............................ 418/142 X
3,697,202  10/1972  Reinhart et al. ................... 418/142

FOREIGN PATENTS OR APPLICATIONS
939,189  10/1963  Germany ........................ 418/142

Primary Examiner—C. J. Husar
Assistant Examiner—Leonard Smith
Attorney—J. L. Carpenter et al.

[57]  ABSTRACT

An oil seal arrangement for a rotary engine having a spring seal mounted on the engine's rotor that maintains sealing engagement with one of the engine's inner end walls and in addition an elastic seal mounted on the rotor that maintains sealing engagement with the spring seal and the rotor.

3 Claims, 3 Drawing Figures

PATENTED JAN 8 1974

3,784,337

OIL SEAL ARRANGEMENT FOR ROTARY ENGINE

This invention relates to oil seals and more particularly to oil seals for rotary engines.

It is current practice in production rotary combustion engines to use an oil seal arrangement mounted on each side of the engine's rotor comprising a precision ground cast iron oil seal which is biased by a stainless steel wave spring to maintain sealing engagement with the engine's opposing inner end wall. In addition, there is provided a rubber O-ring that provides sealing between the cast iron oil seal and the rotor. The present invention results from the desire for an oil seal arrangement that has fewer parts, requires less fabrication and assembly time, and reduces cost by simplification of design and the use of lower cost materials.

The oil seal arrangement for each rotor side according to the present invention has all of the above advantages and consists of only two parts, an annular conical metal spring seal and an annular elastic seal. The spring seal is staked at its outer diameter in an annular groove in a rotor side and at its inner diameter is provided with a hard wear surface which is maintained in sealing engagement with the engine's opposing inner end wall by this seal's spring characteristic. In this arrangement oil pressure acts on the rotor side of the spring seal to assist such sealing engagement. The elastic seal is mounted in the bottom of the oil seal groove and is forced by the spring seal to maintain sealing engagement with the rotor and also the spring seal whereby the combination of the spring seal and the elastic seal cooperatively provide an oil seal between this rotor side and end wall to prevent oil from leaking radially outward to the engine's working chambers.

An object of the present invention is to provide a new and improved oil seal arrangement for a rotary engine.

Another object is to provide an oil seal arrangement for a rotary engine having only a spring seal that engages an end wall and an elastic seal that engages the spring seal and rotor with both seals cooperating to provide oil sealing between the engine's rotor and housing.

Another object is to provide an oil seal arrangement for a rotary engine having an annular spring seal which is mounted in an annular groove in one side of the engine's rotor and which by its own spring characteristic is maintained in sealing engagement with the engine's housing and also forces an annular elastic seal mounted in the groove to maintain sealing engagement with both the rotor and the spring seal and with oil pressure acting behind the spring seal to assist its sealing engagement with the housing.

These and other objects of the present invention will become more apparent from the following description and drawing in which.

Figure 1:
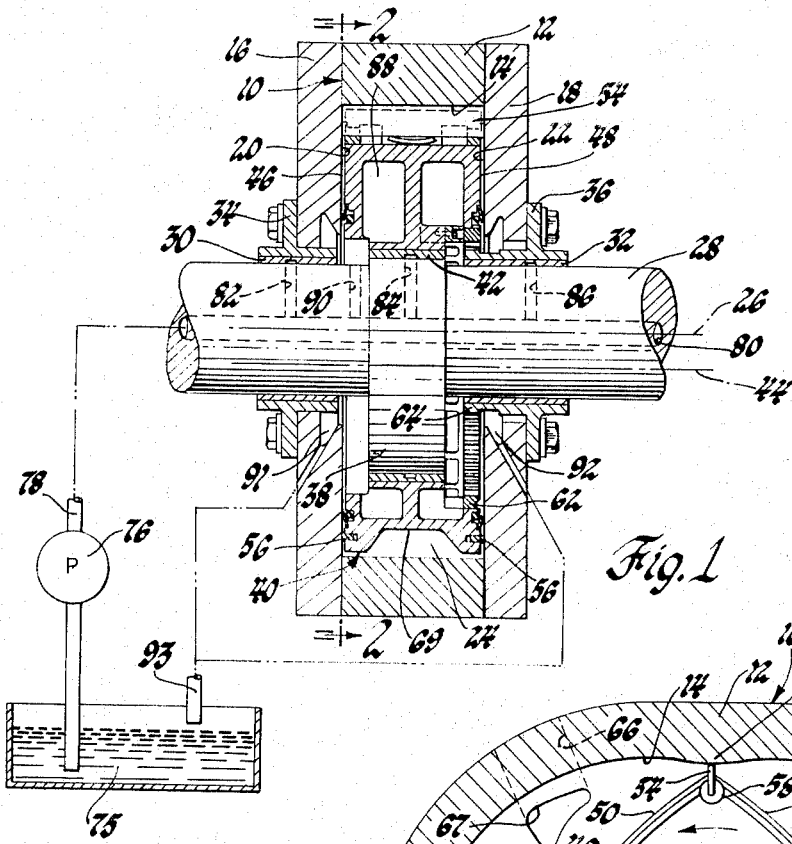
FIG. 1 is a view with parts in section and some parts shown schematically of a rotary combustion engine having oil seal arrangements according to the present invention.
Figure 2:
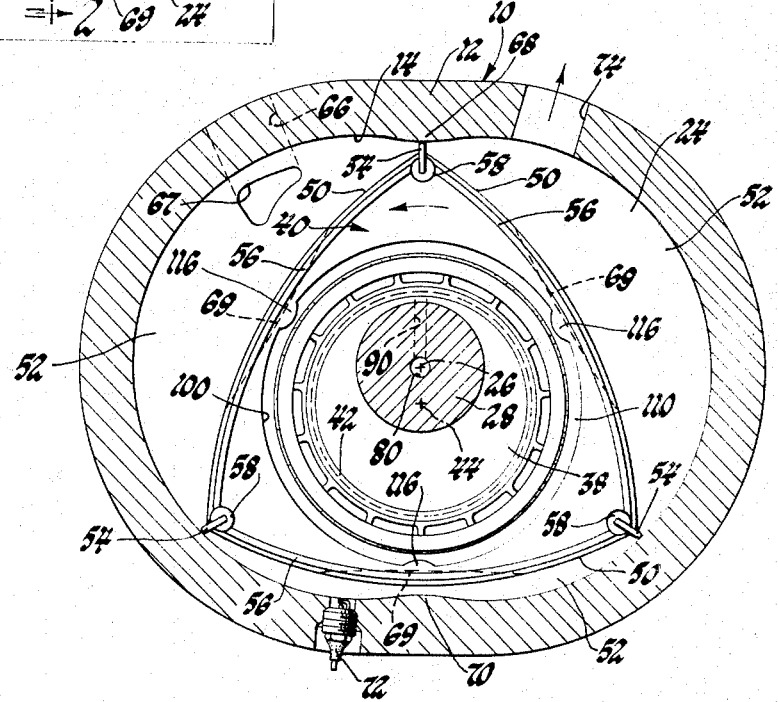
FIG. 2 is a view taken along the line 2—2 in FIG. 1.

The oil seal arrangement according to the present invention is particularly suited for use in a rotary combustion engine of the planetary type such as shown in FIGS. 1 and 2. The engine comprises a housing 10 which has basicly three parts, namely a rotor housing 12 having an inwardly facing inner peripheral wall 14 and a pair of end housings 16 and 18 having parallel, oppositely facing, spaced, inner end walls 20 and 22, respectively. The housing parts are rigidly secured together by bolts, not shown, and the inner housing walls 14, 20 and 22 cooperatively provide a rotor cavity 24. As shown in FIG. 2, the peripheral wall 14 is in the shape of a two-lobed epitrochoid or a curve parallel thereto whose center line is indicated at 26. A crankshaft 28 extends through the rotor cavity 24 and is rotatably supported in sleeve bearings 30 and 32 which are secured in collars 34 and 36 that are bolted to the end housings 16 and 18 as shown in FIG. 1, the crankshaft axis being coincident with the center line 26, parallel to the peripheral wall 14 and at right angles to the end walls 20 and 22. The crankshaft 28 is provided in the rotor cavity 24 with an eccentric 38. A rotor 40 having a centrally located sleeve bearing 42 received on the eccentric 38 is thereby supported for rotation about the eccentric's center line 44 which is thus the rotor's axis.

The rotor 40 has the general shape of a triangle with two parallel sides 46 and 48 at right angles to the rotor axis 44 which face and run close to the end walls 20 and 22, respectively, and three flanks or faces 50 which face the peripheral wall 14 and cooperate therewith and the end walls 20 and 22 to define three variable volume working chambers 52. For sealing of these chambers, there are three apex seals 54 which are each mounted in an axially extending groove at each apex or corner of the rotor 40 and extend the width thereof. Three arcuate side seals 56 are mounted in accommodating grooves in each rotor side and extend adjacent the rotor faces between two apex seals 54. Three cylindrical corner seals 58 are mounted in cylindrical blind bores in each rotor side with each corner seal providing sealing between the ends of two side seals and one apex seal as shown in FIG. 2. The apex seals 54 are spring biased to continuously engage the peripheral wall 14 and both the side seals 56 and the corner seals 58 are spring biased to continuously engage the respective end walls 20 and 22 with the complete gas seal arrangement acting to seal the working chambers 52.

With the two-lobed peripheral wall 14 and the three apex rotor 40, each of the working chambers 52 sequentially expands and contracts between minimum and maximum volume twice during each revolution in fixed relation to the housing by forcing the rotor 40 to rotate at one-third the speed of the crankshaft 28. This is accomplished by gearing comprising an internally toothed gear 62 which is concentric with and fixed to side 48 of the rotor 40. The gear 62 meshes with an externally toothed annular gear 64 which is freely received about and is concentric with the crankshaft 28 and is made stationary by being formed integral with the right-hand collar 36. The gear 62 has one and one-half times the number of teeth as the gear 64 to provide the required speed ratio of 3:1 between the crankshaft 28 and the rotor 40.

A combustible air-fuel mixture from a suitable carburetor arrangement, not shown, is made available to each working chamber 52 by an intake passage 66. Passage 66 extends through the housing and opens to the cavity through aligned ports 67 in the end walls 16 and 18 that are located on the leading side of cusp 68 of the peripheral wall 14 relative to the direction of rotor rotation indicated by the arrow in FIG. 2, there being only one such intake port appearing in this view. A single channel or recess 69 is provided in the center of each chamber face 50 of the rotor 40 to provide for the transfer of working gases past the peripheral wall's other cusp 70 when a rotor face is at or near a top-dead-center position, as shown in FIG. 2, so that the chambers are not divided by the cusp 70 at the time when combustion is to occur therein. A spark plug 72 is mounted in the rotor housing 12 adjacent the cusp 70 with its spark gap exposed to the passing working chambers. As the rotor 40 planetates, the working chambers successfully draw in fuel mixture as the rotor sides radially outward of the side seals 56 periodically uncover the intake ports 67. The fuel mixture is then trapped in each working chamber and compressed and when the rotor face of this chamber is in the vicinity of top-dead-center, this mixture is ignited at the completion of the compression phase, there being provided a suitable ignition system, not shown, for applying voltage to the spark plug 72 at the proper time. Upon ignition of the mixture in each working chamber, the peripheral wall 14 takes the reaction forcing the rotor 40 to continue rotation while the gas is expanding. The leading apex seal 54 of each of the working chambers eventually traverses an exhaust passage 74 on the trailing side of cusp 68 whereby the exhaust products are then expelled through the exhaust passage 74 to complete the cycle.

Describing now the lubrication of this arrangement and also the cooling of the rotor, oil from the engine drains to a sump 75 from which it is drawn by a suitable pump 76 powered from the engine crankshaft 28 and delivered via a delivery line 78 to an axial oil passage 80 in crankshaft 28. Radial oil passages 82, 84 and 86 in crankshaft 28 deliver oil from passage 80 to lubricate the sleeve bearings 30, 42 and 32, respectively. The rotor 40 has a hollow interior 88 and is webbed for rigidity, and a radial oil passage 90 in crankshaft 28 delivers oil from passage 80 to the rotor's interior 88 for cooling of the rotor with the oil carrying the heat from the rotor by passing via annular cavities 91 and 92 in the respective end walls 20 and 22 to branches of a return line 93 that drains to sump 75.

The engine structure thus far described is of a conventional type. The oil seal arrangement according to the present invention is particularly suited for use in engines of this type in providing annular seals between the rotor sides 46 and 48 and the respective adjacent end walls 20 and 22 to prevent the oil supplied for cooling and lubrication from reaching radially outward to the rotor's gas seals and eventually the working chambers.

Figure 3:
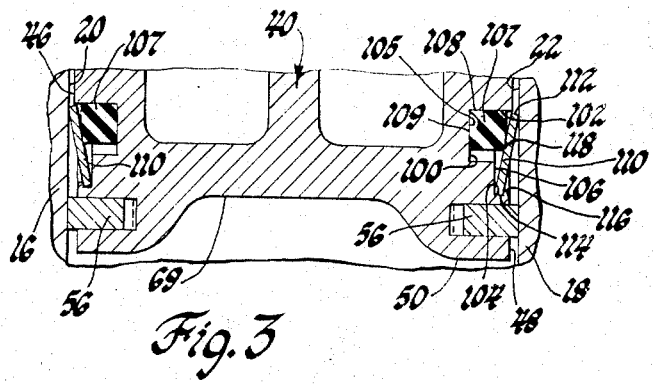
FIG. 3 is an enlarged view showing one of the oil seal arrangements in FIG. 1.

Each of the oil seal arrangements according to the present invention includes a single, circular, axially facing groove 100 in the respective rotor sides 46 and 48 which is located concentric with the rotor 40 radially inward of the side seals 56 and corner seals 58 and faces the closely adjacent end wall of the engine housing. As best shown in FIG. 3, each of the grooves 100 has axially extending radially outwardly and inwardly facing sides 102 and 104 and a stepped flat bottom with the deepest bottom portion 105 being a radial flat and at a smaller radius than the other radial flat bottom portion 106. A circular elastic seal 107 that is square in axial cross-section is mounted in each of the oil seal grooves 100 with its radially inwardly facing side 108 sealingly gripping the radially outwardly facing groove side 102 and its back side 109 against the deep bottom portion 105 of the oil seal groove. A circular conical spring seal 110 of uniform thickness is also mounted in each of the oil seal grooves 100 with its back side against the front side of the elastic seal 107, its front side facing outward of the groove with an inner radius edge 112 projecting out past the rotor side and its outer radius edge 114 received on the groove ledge or step against the outer corner of the shallow bottom portion 106. The outer radius edge 114 of the spring seal 110 constitutes the base of this member and this base is secured in the oil seal groove by staking the rotor 40 at three or more points 116 equally angularly spaced about the rotor side edge of the outer groove side 104.

The spring seals 110 are spring-wise of the Belleville type being made of spring steel and have free axial heights which are sized so that when the rotor 40 is assembled in the engine, the spring seal 110 on each rotor side is maintained in sealing engagement at its front side inner radius edge 112 with the adjacent end wall. Preferably the inner radius edge or wear surface 112 of the spring seals 110 is provided with a hard wear surface such as chromium plate for prolonged oil seal life. In addition, the free axial heights of the elastic seals 107 are sized so that the spring seals 110, when in assembled conditions, each act to maintain the associated elastic seal 107 in sealing engagement with the rotor and also with the spring seal as shown by the slight deformation of the outer radius edge 118 of the front side of the elastic seal where it engages the rotor side of the spring seal. The elastic seals 107 may be and are preferably lathe-cut rings of rubber or rubber-like material such as polyacrylate and are thus relatively inexpensive as compared with O-rings.

As the rotor 40 planetates, the oil seal arrangements move therewith rotating about the rotor axis while also turning about the crankshaft axis. Each of the spring seals 110 prevents oil from flowing radially outward past the end housing wall against which it sealingly slides while each of the elastic seals 107 backs up the associated spring seal and prevents radial outward oil flow between the rotor 40 and elastic seal and also between the elastic seal and spring seal. In addition, with this arrangement of the spring seals 110 the oil is trapped therebehind and its pressure which mainly results from centrifugal effect acts to assist in maintaining the spring seals in sealing engagement with the respective end walls while also acting in the axial direction to assist in maintaining the elastic seals in sealing engagement with the rotor at the bottom of the oil seal grooves.

Thus, it will be appreciated that each of the seals 110 is in effect an integral seal and spring and together with the elastic seal 107 constitute a simple two-part seal arrangement with each part having several functions and being of relatively inexpensive material and with this simple design requiring little fabrication and assembly time.

The above described embodiment is illustrative of the invention which may be modified within the scope of the appended claims.

We claim:

1. An oil seal arrangement for a two-sided rotor that rotates between two inner projecting walls of a rotary machine and has gas seals on each side sealingly engaging the adjacent end wall comprising an annular oil seal groove in each of said rotor sides located concentrically of the rotor and radially inwardly of said gas seals, an annular elastic seal mounted in each of said oil seal grooves having a radially inwardly facing side sealingly engaging a radially outwardly facing side of the oil seal groove and a back side engaging a bottom portion of the oil seal groove and a front side facing outward of the oil seal groove, an annular spring seal mounted in each of said oil seal grooves having a rotor side engaging the front side of the elastic seal in the oil seal groove and an outer radius edge secured to said rotor and a front side facing outward of the oil seal groove having an inner radius edge porjecting axially of said rotor toward the adjacent end wall, said spring seals having free axial heights sized so that when said rotor is assembled between said end walls said spring seals at said inner radius edges are maintained in sealing engagement with the adjacent end walls as said rotor rotates, and said elastic seals having free axial heights sized so that said spring seals each act to maintain the associated elastic seal in sealing engagement with the bottom of its oil seal groove and also with the rotor side of this spring seal.

2. An oil seal arrangement for a two-sided rotor that rotates between two inner end walls of a rotary machine and has gas seals on each side sealingly engaging the adjacent end wall comprising an annular oil seal groove in each of said rotor sides located concentrically of the rotor and radially inwardly of said gas seals, an annular elastic seal mounted in each of said oil seal grooves having a radially inwardly facing side sealingly gripping a radially outwardly facing side of the oil seal groove and a back side engaging a bottom portion of the oil seal groove and a front side facing outward of the oil seal groove, an annular spring seal mounted in each of said oil seal grooves having a rotor side engaging the front side of the elastic seal in the oil seal groove and an outer radius edge secured to said rotor and a front side facing outward of the oil seal groove having an inner radius edge projecting axially of said rotor toward the adjacent end wall, said spring seals having free axial heights sized so that when said rotor is assembled between said end walls said spring seals at said inner radius edges are maintained in sealing engagement with the adjacent end walls as said rotor rotates, and said elastic seals having free axial heights sized so that said spring seals each act to maintain the associated elastic seal in sealing engagement with the bottom of its oil seal groove and also with the rotor side of this spring seal and whereby oil is trapped on the rotor side of each said spring seal and acts to assist in maintaining said spring seals in sealing engagement with the respective end walls while also acting to assist in maintaining said elastic seals in sealing engagement with said rotor at the bottom of said oil seal grooves.

3. An oil seal arrangement for a two-sided rotor that rotates between two inner end walls of a rotary machine and has gas seals on each side sealingly engaging the adjacent end wall comprising a circular oil seal groove in each of said rotor sides located concentrically of the rotor and radially inwardly of said gas seals, a circular elastic seal of rectangular cross-section mounted in each of said oil seal grooves having a radially inwardly facing side sealingly gripping a radially outwardly facing side of the oil seal groove and a back side engaging a bottom portion of the oil seal groove and a front side having an outer radius edge facing outward of the oil seal groove, a conical circular spring seal of uniform thickness mounted in each of said oil seal grooves having a rotor side engaging the outer radius edge of the front side of the elastic seal in the oil groove and an outer radius edge secured to said rotor and a front side having a free inner radius edge projecting axially of said rotor toward the adjacent end wall, said spring seals having free axial heights sized so that when said rotor is assembled between said end walls said spring seals at said inner radius edges are maintained in sealing engagement with the adjacent end walls as said rotor rotates, and said elastic seals having free axial heights sized so that said spring seals each act to maintain the associated elastic seal in sealing engagement with the bottom of its oil seal groove and also with the rotor side of this spring seal and whereby oil is trapped on the rotor side of each said spring seal and acts to assist in maintaining said spring seals in sealing engagement with the respective end walls while also acting to assist in maintaining said elastic seals in sealing engagement with said rotor at the bottom of said oil seal grooves.

* * * * *

PO-1050
(5/69)

UNITED STATES PATENT OFFICE
CERTIFICATE OF CORRECTION

Patent No. 3,784,337   Dated January 8, 1974

Inventor(s) John G. Sebring, Thomas C. Downs

It is certified that error appears in the above-identified patent and that said Letters Patent are hereby corrected as shown below:

In the claims, Column 4, line 62, "projecting" should read -- end --.

Signed and sealed this 17th day of September 1974.

(SEAL)
Attest:

McCOY M. GIBSON JR.
Attesting Officer

C. MARSHALL DANN
Commissioner of Patents